Jan. 13, 1931.  E. TIMBS  1,788,498
THREE-SPEED FRICTION CLUTCH DRAWWORKS
Filed April 21, 1924  2 Sheets-Sheet 1

Inventor
Edward Timbs
By Lyon+Lyon
Attorneys

Jan. 13, 1931.                    E. TIMBS                    1,788,498
                    THREE-SPEED FRICTION CLUTCH DRAWWORKS
                    Filed April 21, 1924        2 Sheets-Sheet 2

Inventor
Edward Timbs
By Lyon & Lyon
Attorneys

Patented Jan. 13, 1931

1,788,498

UNITED STATES PATENT OFFICE

EDWARD TIMBS, OF LOS ANGELES, CALIFORNIA, ASSIGNOR, BY MESNE ASSIGNMENTS, TO THE NATIONAL SUPPLY COMPANY, OF TOLEDO, OHIO, A CORPORATION OF OHIO

THREE-SPEED FRICTION-CLUTCH DRAW WORKS

Application filed April 21, 1924. Serial No. 707,937.

This invention relates to rotary drawworks such as used in the drilling of deep wells. The general object of the invention is to provide a rotary drawworks of compact construction in which the cable drum may be driven at three speeds but in which the total length of the drawworks is substantially the same as a drawworks having a two-speed drive; also to improve the general construction of rotary drawworks, and provide means for mounting and driving the drum which will enable the drum to rotate freely at will without causing movement in the driving connections to the drum.

A further object of the invention is to provide improved means for mounting the controlling levers for the clutches which enable the drum to be driven at the different speeds, and to provide an improved friction clutch for driving the drum at will from the drum-shaft.

Further objects of the invention will appear hereinafter.

The invention consists in the novel parts and combination of parts to be described hereinafter, all of which contribute to produce an efficient three-speed friction clutch drawworks.

A preferred embodiment of the invention is described in the following specification, while the broad scope of the invention is pointed out in the appended claims.

Figure 1:
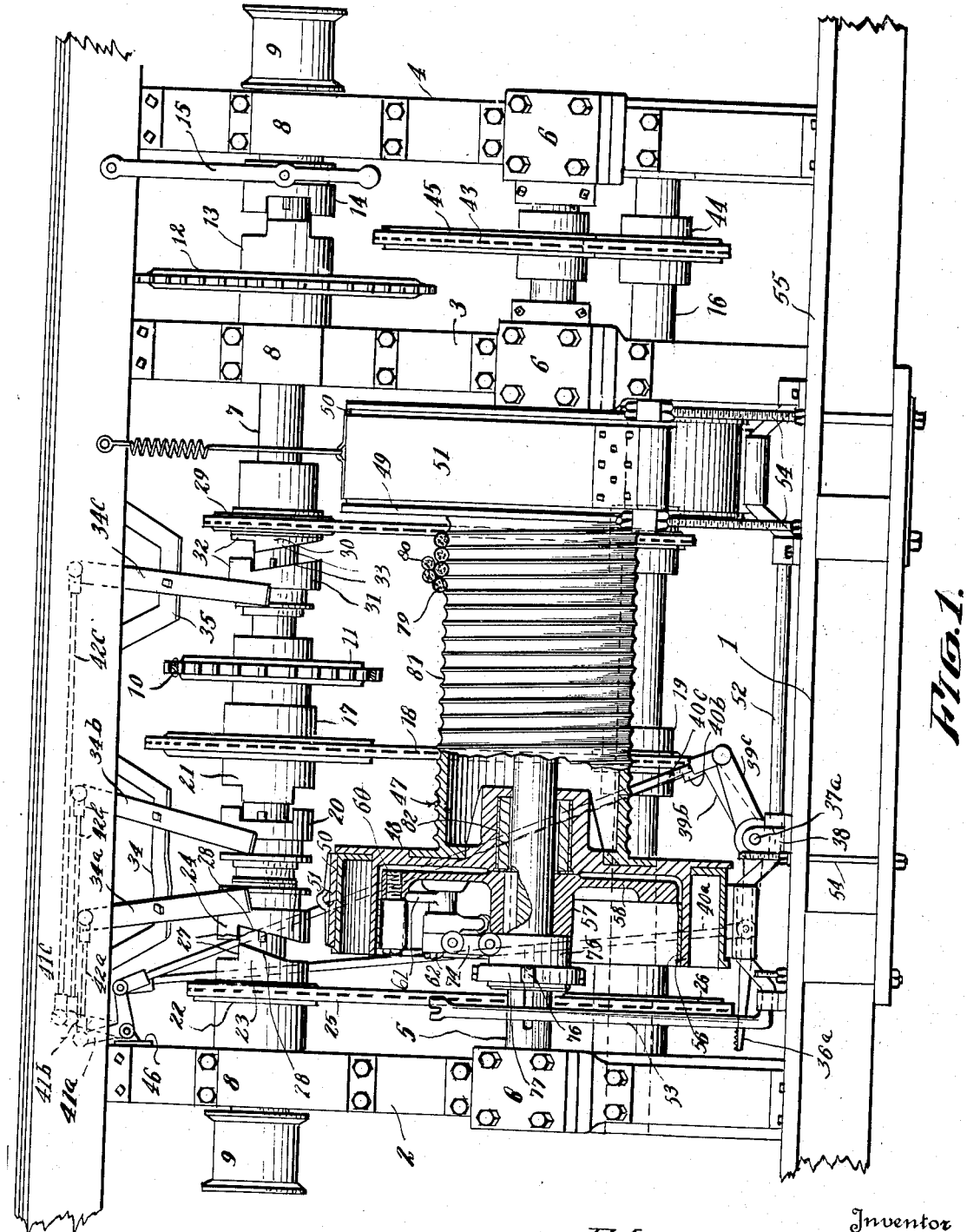
Figure 1 is a side elevation and partial section, with parts broken away, illustrating a drawworks embodying my invention.

The drawworks includes a frame 1, of any suitable construction, and including three posts 2, 3 and 4, which may constitute part of the derrick frame. On the posts 2, 3 and 4 there is supported a rotatable drum-shaft 5 in suitable bearings 6.

I provide a pair of shafts to carry a plurality of clutches and drive connections between the pair of shafts, that is, I provide a line shaft 7 which is capable of driving the drum-shaft at a plurality of different speeds, but I do not connect the line-shaft directly to the drum-shaft. In this way I avoid the necessity for three different driving connections to the drum-shaft, and this enables the drawworks to embody three different speed drives without substantially increasing the length of the drum-shaft.

The line-shaft 7 is rotatably supported on the frame in suitable bearings 8 and may be provided at its ends with the usual catheads 9. This shaft is driven by suitable means such as a sprocket chain 10 from the engine, running over a sprocket wheel 11. At one end of the drawworks, and preferably between the intermediate post 3 and the end post 4, I provide a sprocket wheel 12 loose on the shaft for driving a rotary drill table. A suitable clutch is provided. In the present instance the hub of the sprocket wheel is formed into a clutch member 13, to cooperate with a clutch collar 14 splined on the shaft, and the clutch which is formed of the two clutch members 13 and 14 may be closed at will by means of a lever 15. Of course, when this clutch is open, the shaft 7 rotates without driving the sprocket wheel 12.

I provide a plurality of driving connections from the line-shaft to a counter-shaft 16, which, like the shaft 7, is parallel with the drum-shaft 5. The counter-shaft 16, however, is located at the back of the drawworks and preferably below the level of the other two shafts. In the present instance, I provide a three-speed drive for driving the counter-shaft from the line-shaft. These drives preferably involve the use of sprocket chains.

The high-speed driving connection includes a sprocket wheel 17 loose on the line-shaft 7 and connected by a sprocket chain 18 with a sprocket wheel 19 which is rigid with the counter-shaft. A sliding clutch collar 20 cooperates with the clutch member 21 formed on the hub of the sprocket wheel 17 and constitutes a high-speed clutch which may be closed at will, it being understood that the clutch collar 20 is splined on the shaft.

The clutch composed of the members 20, 21 is a square-jaw clutch, that is to say, it has the features of construction illustrated in Figure 1, enabling the clutch to drive in either direction.

In addition to this, I provide a low-speed clutch and a second-speed clutch on the line-shaft. The low-speed clutch comprises a sprocket wheel 22 which is loose on the shaft and has its hub formed into a clutch member 23 to cooperate with a sliding clutch collar 24 splined on the shaft 7. The sprocket wheel 22 drives a chain 25, which drives a sprocket wheel 26 on the counter-shaft.

The clutch composed of the clutch members 23 and 24 is a one-way-drive clutch, that is to say, it has square shoulders 27 which cooperate to drive the sprocket wheel 22 in one direction only, and these clutch members are provided with cooperating inclined faces 28 which operates to throw the clutch open if the clutch collar 24 is driven in a reverse direction, or, which is the same thing, if the sprocket 22 is driven at a higher speed by the high-speed driving connection when the low-speed clutch is in its closed condition.

The second-speed or intermediate-speed drive is similar in construction to the low-speed driving connection, that is to say, it includes a sprocket wheel 29 which is loose on the shaft 7 and the hub of which constitutes a clutch member 30 to cooperate with a sliding clutch collar 31 splined on the shaft. These clutch members constitute a second-speed clutch which is also a one-way-drive clutch with square shoulders 32 enabling the clutch collar 31 to drive the sprocket wheel 29 in one direction but having inclined cooperating faces 33 which operate to open the clutch automatically if the high-speed driving connection is thrown into operation while this clutch is in its closed condition.

These clutches are all controllable from the operator's position. In order to accomplish this, I provide a bracket 34 and a bracket 35 carried on the frame, and the former operates as a support for the low-speed clutch lever 34$^a$. The bracket 34 also supports the high-speed clutch lever 34$^b$. The bracket 35 supports the second-speed clutch lever 34$^c$. I provide controlling levers for these three clutch levers, which are mounted with a common axis of rotation. These controlling levers are in the form of three foot levers 36$^a$, 36$^b$, and 36$^c$.

The foot lever 36$^a$ is disposed toward the outside (see Figure 2) and is rigidly attached to an inner rock-shaft 37$^a$. The lever 36$^b$ is attached to a tubular inner shaft 37$^b$ which is rotatably mounted on the solid inner shaft 37$^a$. The foot lever 36$^c$ is rigidly secured to an outer tubular shaft 37$^c$. These three shafts are mounted in suitable bearings 38 and their inner ends are connected by suitable means respectively with the clutch levers 34$^a$, 34$^b$, and 34$^c$. The inner shaft 37$^a$ is connected by a lever 39$^a$ and a link 40$^a$ with a bell-crank lever 41$^a$, the upper arm of which is connected by a link 42$^a$ with the lever 34$^a$ (see Figure 1). In this case the lever 39$^a$ extends in the same direction as the foot lever 36$^a$, from the shaft 37$^a$.

The inner tubular shaft carries a rigid lever 39$^b$ which is connected by a link 40$^b$ with a bell-crank lever 41$^b$, the upper arm of which is connected by a link 42$^b$ with the clutch lever 34$^b$. In a similar manner, the outer tubular shaft 37$^c$ carries a rigid arm or lever 39$^c$ which is connected by a link 40$^c$ with a bell-crank lever 41$^c$, the upper arm of which is connected by a link 42$^c$ with the clutch lever 34$^c$. With this arrangement, it will be evident that each of these three clutches can be closed at will by pressing down on the proper foot lever. If desired, springs may be provided corresponding to each clutch lever to hold the clutch open until it is closed by its controlling lever.

I provide means for driving the drum-shaft 5 from the counter-shaft 16, and this means is preferably in the form of a single driving connection embodying the use of a sprocket chain 43 passing over a sprocket wheel 44 on the counter-shaft and a sprocket wheel 45 on the drum-shaft.

The bell-crank levers 41$^a$, 41$^b$, and 41$^c$ may be all mounted upon a common pivot pin carried on a bracket 46 attached to the upper part of the frame.

On the drum-shaft 5 is mounted a drum 47, provided with two heads 48 and 49 which have flanges 50 to receive brake bands 51, said brake bands being connected with a crank-shaft 52 which may be operated at will by a lever 53. This crank-shaft 52 is attached to the free ends of the brake bands and enables the lever 53 to tighten the bands at will. The other ends of the bands are attached to anchor bolts 54 secured to the floor 55 of the derrick.

The flange 50 of the drum-head 48 projects away from the disc of the head so that the effect is that the head 48 is open on its outer side. I utilize this space in the open head of the drum to house a friction clutch. In this way the friction clutch may be attached to the shaft without necessitating any increase in the length of the drum-shaft 5. The clutch is preferably of the expansion type, that is to say, it involves the use of a shoe which is expanded outwardly against a flange on the drum-head. For this purpose, I could utilize the regular flange 50 of the drum-head, but this would make the friction clutch larger than necessary, and hence I prefer to provide a special flange 56. Within the space surrounded by this clutch flange 56 I provide a clutch member having a hub 57 and a disc 58, and on this disc I attach a brake shoe device preferably in the form of an expansion ring 59 (see Fig. 2). One end of this expansion ring is anchored to the disc 58 by a suitable fixed bolt 60. The other end of the expansion ring 59 is movably mounted, and I provide means for expanding the expansion ring against the inner face of the flange 56 at will. Any suitable means may be employed for this purpose, but I prefer to provide a rocker in the form of a bell-crank lever 61 which is mounted to rock on a rocking-pin 62 (see Figure 3). This rocking-pin has a head 64 which is adjustably mounted in a T-slot of arcuate shape formed in a boss 65 on the face of the disc. This bolt or pin projects out horizontally from the face of the disc and carries a clevis 66. Between the arm 61ª of the bell-crank 61 and the clevis 66 the end of the expansion ring 59 is attached on pin 70. The construction at this point should be such as to enable the pin 62 to be adjusted along the slot and secured in any adjusted position desired. A distance-sleeve 62ª is provided, which cooperates with nuts 62ᵇ to clamp the bolt 62 securely in place.

As the strain upon this pin 62 is very great, I provide means for bracing it in position, in addition to means for clamping it in the slot. For this purpose, I provide a bracing bolt 67, the outer end of which is threaded and passes loosely through an elongated slot in a curved lug 68 on the face of the disc 58. A clamping nut 69 is provided on each side of this lug so that the bracing bolt 67 can be clamped in any desired position in the slot. This enables the bolt to be shifted in a lateral direction when its outer end, that is to say, its head end which engages the pin 62, is shifted along the slot with the bolt 62.

The long arm of the bell-crank lever is attached by a loose pin 71 to a swivel knuckle 72, and said swivel knuckle 72 being connected by a loose pin 73 with a strut link 74 (see Figure 1). The inner end of this strut link 74 is pivotally attached to a sliding collar 75 on the drum-shaft, and when this sliding collar 75 is shoved to the right, as viewed in Figure 1, it will produce an outward thrust in the strut link 74 and this will rock the bell-crank lever 61 in a direction to expand the expansion ring 59 and press it forcibly against the inner face of the flange 56.

Figure 2:
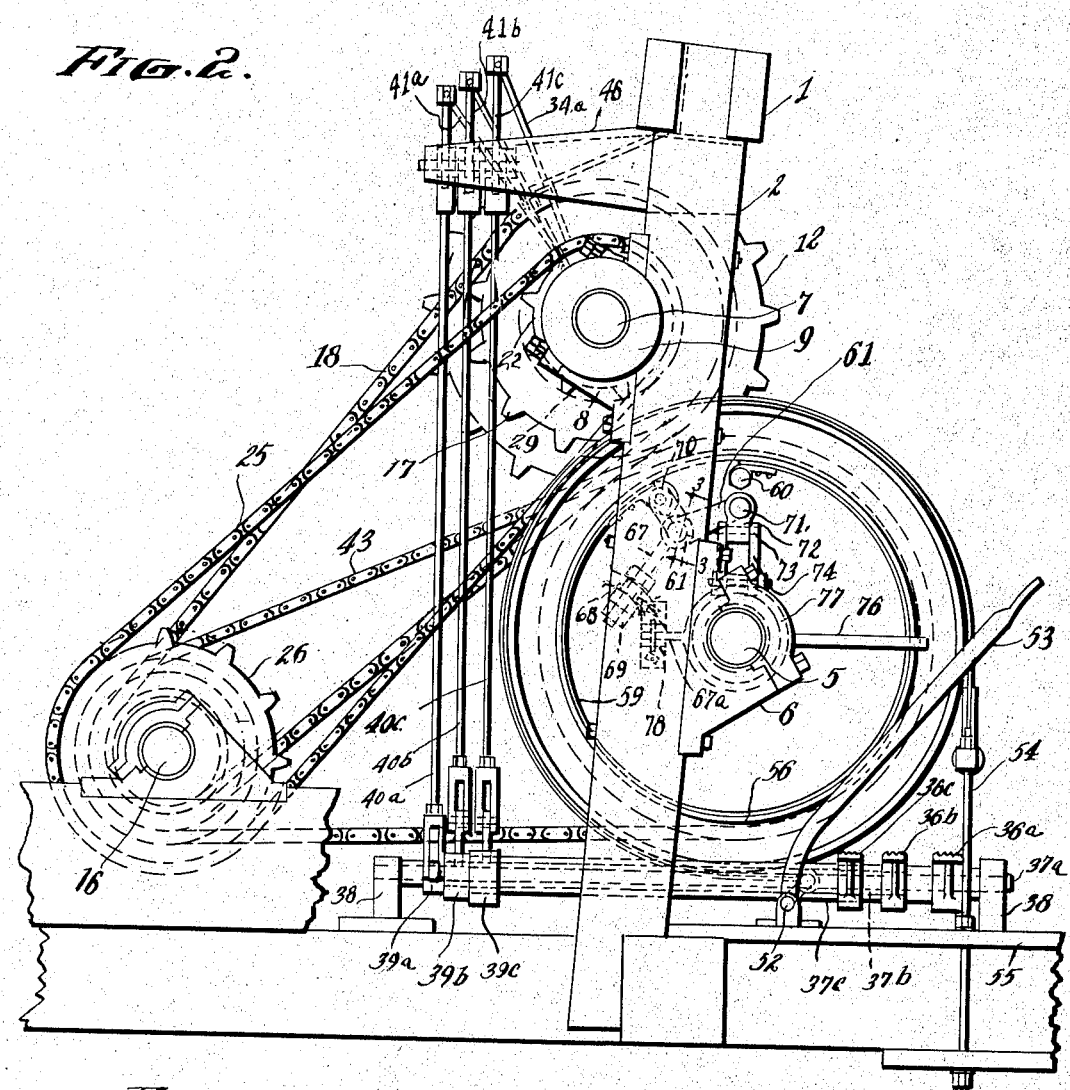
Fig. 2 is an end elevation of the drawworks shown in Figure 1, certain parts being broken away.
Figure 3:
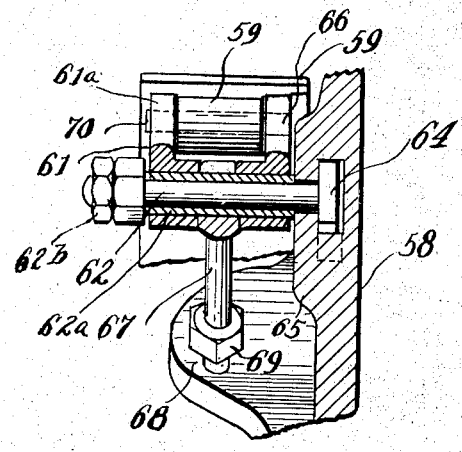
Fig. 3 is a section taken on the line 3—3 of Figure 2 and further illustrating details of the friction clutch.

The collar 75 is controlled at will by means of a clutch lever 76 (see Figure 1), the middle portion of which is formed into a yoke 77 connected by the usual pins with the collar 75, and the inner end of this lever is pivotally supported on a fixed bracket 78, on post 2 (see dotted lines in Fig. 2).

The great depth of some wells, such as oil wells necessitates the use of an extremely long cable, and with cable drums as now used this may necessitate placing three wraps of cable on the drum. When this occurs, there is a tendency for the taut cable to spread the coils of the next inner wrap. This is very destructive to the cables and should be avoided if possible. I meet this difficulty by making the drum 47 of considerably larger diameter than the drums now used in practice, and I make the drum of such length as will enable the entire length of cable to be housed upon the drum in two wraps or courses; an inner wrap, the location of which is indicated by the coils 79. and an outer wrap, indicated by coils 80 (see Figure 1). I also provide the drum face with a helical groove 81 which operates as a seat for the coils of the inner wrap. With this arrangement, the coils of the outer wrap can be seated and nested, as illustrated, on the coils of the inner wrap. However, the tension in the outer coils cannot force the coils of the inner wrap apart by reason of the groove 81 on the face of the drum. A drum of large diameter such as I use has the advantage that it does not necessitate bending the cable to a relatively small diameter in wrapping it onto the drum, and hence the use of such a drum tends to increase the "life" of the cable.

The drum is preferably mounted to run free on the drum shaft; to this end each head of the drum is provided with a roller bearing 82 which enables the drum to rotate freely on the drum-shaft when the friction clutch composed of the expansion ring 59 and the flange 56 is open. The rotation of the drum without rotating the drum-shaft is advantageous because it tends to prevent vibration when the drum is rotating at the very high speeds which occur in letting tubing run down into the well as a high speed. Furthermore, when the drum rotates loosely on the shaft, the bearings are in the drum and are therefore closer together than when the shaft rotates in bearings at the posts. This also tends to reduce vibration.

It is to be understood that the embodiment of the invention described herein is only one of the many embodiments this invention may take, and I do not wish to be limited in the practice of the invention, nor in the claims, to the particular embodiment set forth.

What I claim is:—

1. In a rotary draw-works for an oil derrick, the combination of a frame, a drum-shaft mounted on the frame, a drum loosely mounted on the drum-shaft, a line-shaft carried on the frame, means for driving the line-shaft at one speed from an engine, a counter-shaft mounted on the frame, means for driving the counter-shaft at a low speed from the line-shaft, a low-speed clutch on the line-shaft for the same, means for driving the counter-shaft from the line-shaft at a second speed, a second-speed driving clutch on the line shaft, means for driving the counter-shaft at a high speed from the line-shaft, a high speed clutch on the line-shaft for driving the same, a driving connection from the counter-shaft to the drum-shaft, a plurality of clutch levers corresponding to the clutches, a plurality of rock-shafts coaxial with each other, and each having its corresponding controlling lever lying near the derrick floor, a bearing for the innermost rock-shaft on the derrick floor, and means connecting the rock-shafts respectively with the clutch levers.

2. In a rotary draw-works for an oil derrick, the combination of a frame, a drum-shaft mounted on the frame, a drum loosely mounted on the drum-shaft, a clutch on the drum-shaft for driving the drum from the drum-shaft, a line-shaft mounted on the frame, means for driving the line-shaft at one speed from an engine, a counter-shaft mounted on the frame, means for driving the counter-shaft at a low speed from the line-shaft, a low-speed clutch on the line-shaft for the same, means for driving the counter-shaft from the line-shaft at a second speed, a second-speed driving clutch on the line-shaft, means for driving the counter-shaft at a high speed from the line-shaft, a high-speed clutch on the line-shaft for driving the same, a driving connection from the counter-shaft to the drum-shaft, a clutch lever corresponding to each of the clutches, an inner rock-shaft with its foot-lever near the derrick floor, a tubular rock-shaft coaxial with the inner rock-shaft and having its foot-lever, an outer tubular rock-shaft having its foot-lever and coaxial with the first named rock-shafts, a bearing for the innermost shaft on the derrick floor, and means connecting the rock-shafts respectively with their corresponding clutch levers.

Signed at Torrance, Calif., this 14th day of April, 1924.

EDWARD TIMBS.